United States Patent
Shvodian

(10) Patent No.: US 12,255,854 B2
(45) Date of Patent: Mar. 18, 2025

(54) USER EQUIPMENT SPECIFIC BANDWIDTHS

(71) Applicant: T-Mobile USA, Inc., Bellevue, WA (US)

(72) Inventor: William M. Shvodian, McLean, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 337 days.

(21) Appl. No.: 17/662,458

(22) Filed: May 9, 2022

(65) Prior Publication Data

US 2023/0361977 A1 Nov. 9, 2023

(51) Int. Cl.
| | |
|---|---|
| *H04W 4/00* | (2018.01) |
| *H04L 5/00* | (2006.01) |
| *H04W 72/0453* | (2023.01) |
| *H04W 72/51* | (2023.01) |
| *H04W 76/10* | (2018.01) |
| *H04W 74/00* | (2009.01) |
| *H04W 88/02* | (2009.01) |
| *H04W 88/08* | (2009.01) |

(52) U.S. Cl.
CPC ....... *H04L 5/0098* (2013.01); *H04W 72/0453* (2013.01); *H04W 72/51* (2023.01); *H04W 76/10* (2018.02); *H04W 74/006* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 11,115,850 | B2* | 9/2021 | Xiong | H04L 5/00 |
| 2020/0221308 | A1* | 7/2020 | Liao | H04L 5/001 |
| 2020/0296656 | A1* | 9/2020 | Amuru | H04L 1/1816 |
| 2021/0250156 | A1* | 8/2021 | Kim | H04W 72/53 |
| 2022/0022222 | A1 | 1/2022 | Abotabl et al. | |
| 2022/0116923 | A1* | 4/2022 | Kim | H04L 5/0098 |
| 2022/0225392 | A1* | 7/2022 | Lee | H04W 72/23 |
| 2022/0287102 | A1* | 9/2022 | Futaki | H04W 76/27 |
| 2023/0042361 | A1* | 2/2023 | Wu | H04W 48/08 |
| 2023/0070450 | A1* | 3/2023 | Liu | H04L 5/0007 |

(Continued)

FOREIGN PATENT DOCUMENTS

WO WO2022061588 A1 3/2022

OTHER PUBLICATIONS

The Extended European Search Report mailed Oct. 9, 2023 for European patent application No. 23169595.8, 14 pages.

*Primary Examiner* — Bob A Phunkulh
(74) *Attorney, Agent, or Firm* — Lee & Hayes, P.C.

(57) ABSTRACT

System and methods for allocating user equipment (UE) specific carrier bandwidth are described. A bases station may advertise cell specific carrier bandwidth and an initial bandwidth part that represent a subset of the carrier bandwidth available to the base station. A UE may respond with an indication that is has bandwidth capabilities that include a greater range of frequencies than those of the cell specific carrier bandwidth. In response, the base station may instruct the UE to use this greater range of frequencies as a UE specific carrier bandwidth, allowing the UE to operate using a range of frequencies that exceed the advertised cell specific carrier bandwidth.

18 Claims, 7 Drawing Sheets

(56) References Cited

U.S. PATENT DOCUMENTS

| | | | |
|---|---|---|---|
| 2023/0122848 A1* | 4/2023 | Kim | H04L 5/001 |
| | | | 455/522 |
| 2023/0131663 A1* | 4/2023 | Sayenko | H04L 5/0044 |
| | | | 370/329 |
| 2023/0180072 A1* | 6/2023 | Ranjan | H04W 48/18 |
| | | | 455/436 |
| 2023/0247501 A1* | 8/2023 | Kim | H04W 36/185 |
| | | | 370/331 |

* cited by examiner

USER EQUIPMENT SPECIFIC BANDWIDTHS

BACKGROUND

With the rapid growth in the number of wireless communications devices (e.g., user devices such as mobile telephones, smartphones, tablets, laptops, etc.) in use, the networks that provide services to such devices have grown to accommodate them. Along with a large increase in the number of network devices deployed to provide services to user devices, the bandwidth available for providing such services has also expanded. The capabilities of user devices and wireless network devices have also increased, allowing the use smaller portions of bandwidth for transmission of increasingly large amounts of data. However, with the proliferation of user and network devices and the rapid development of the standards and technologies that support them, the capabilities of user devices and the network devices that may interact with them can vary. Efficiently supporting user devices with network devices that may have capabilities that differ from those of the user devices may pose a challenge for a network operator.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
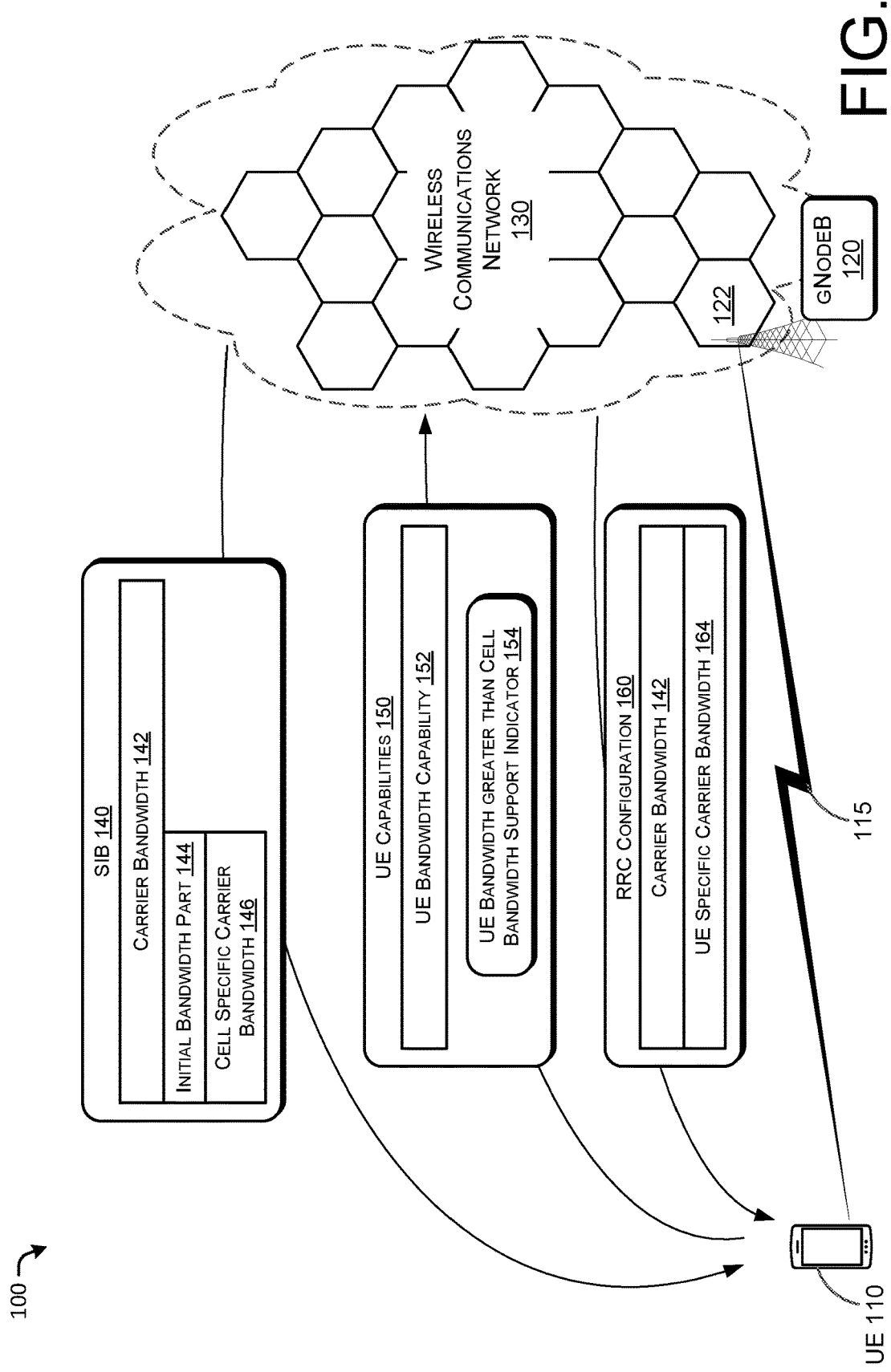
FIG. 1 is a schematic diagram of an illustrative wireless communication network environment in which systems and methods for allocating UE specific carrier bandwidth may be implemented, in accordance with examples of the disclosure.

This disclosure is directed in part to systems and techniques for more efficiently assigning bandwidth to a user equipment (UE) (e.g., smartphone, cell phone, mobile device, wireless communication device, mobile station, etc.) in advanced wireless communications networks by base stations that may not share the capabilities of such UEs. Such advanced networks include networks that support one or more 3GPP standards, including, but not limited to, Long Term Evolution (LTE) networks (e.g., 4G LTE networks) and New Radio (NR) networks (e.g., 5G NR networks). However, the disclosed systems and techniques may be applicable in any network or system in which a user device may request and receive access to communicate with network and/or remote devices using any protocol. Note that, as used herein, "carrier" and "channel" may be used interchangeably to refer to a set of one or more contiguous frequencies.

In conventional systems, a base stations (e.g., gNodeB, eNodeB, NodeB, base transceiver station (BTS), etc.) may advertise the bandwidth available for user devices. This may be an advertisement that includes an indication of single contiguous range of frequencies associated with the overall or total bandwidth available to user devices in the cell associated with the base station and/or otherwise associated with the operator of the base station. This overall available bandwidth may be referred to herein as "cell specific carrier bandwidth." The advertisement from a base station may also, or instead, include one or more indications of one or more subsets of the total available bandwidth or cell specific carrier bandwidth. In various examples, these subsets of bandwidth may be advertised as one or more "bandwidth parts." These subsets of bandwidth may be advertised as a size of the subset of bandwidth and/or a beginning frequency (e.g., for the subset of bandwidth of a particular size). A size of a range of frequencies may also be referred to as a "width." Some base stations may not be capable of advertising bandwidth parts or subsets of the cell specific carrier bandwidth. Still other base stations may be capable of advertising a subset of the cell specific carrier bandwidth that is the same (e.g., size) as the cell specific carrier bandwidth (e.g., equal to the size cell specific carrier bandwidth).

As an example, a band that may be available to a carrier for use in a wireless network is the 5G NR n25 band that includes uplink frequencies of 1850-1915 MHz and downlink frequencies of 1930-1995 MHz. This band was formerly defined as dividable into 5, 10, 15, and 20 MHz channels. However, updates to the applicable standards and industry practice have added 25, 30, 35, 40, and 45 MHz channels to this band. Therefore, there may currently be UEs operating that are capable of using 5, 10, 15, and/or 20 MHz channels of the n25 band, but not 30, 35, 40, and/or 45 MHz channels, while other, more current UEs may be capable of operating at any such channels. There may also be UEs that are capable using the entire bandwidth of the n25 band but not using subsets or sub-bands of the n25 band. Base stations in a network operating in the n25 band may need to support these various types of devices, but may not be capable of advertising bandwidth parts, or bandwidth parts that are not substantially the same size as the cell specific carrier bandwidth.

The disclosed systems and methods enable UEs to operate with greater bandwidth in a cell when they are capable of doing so while interoperating with base stations that may not be capable of advertising bandwidth parts smaller than the cell specific carrier bandwidth. In various embodiments, rather than advertising an initial bandwidth part that is smaller than the size of the cell specific carrier bandwidth, a base station may advertise a cell specific carrier bandwidth that is smaller than, or a subset of, the bandwidth available for the cell and an initial bandwidth part that is substantially the same size as the advertised cell specific carrier bandwidth. This advertisement may be broadcast in a system information block (SIB), such as a Long-Term Evolution (LTE) or New Radio (NR) SIB (e.g., SIB1, SIB2, SIB3, etc.).

A UE, in response to detecting a SIB from a base station advertising available bandwidth, may respond with one or more messages indicating one or more capabilities of the UE. A UE capabilities message may be included in and/or part of an interaction between the UE and the base station intended to establish a communications session. For example, the UE may transmit a request to establish a communications session with the base station that includes an indication of one or more UE capabilities. Included among such capabilities may be an indication that the UE may be capable of communicating with the base station using particular bandwidth that is greater (in size) than the base station's advertised cell specific carrier bandwidth and initial bandwidth part. In response to this indication of UE capabilities, the base station may then configure a communications session for the UE using the larger bandwidth indicated by the UE as the UE specific carrier bandwidth rather than the smaller base station advertised cell specific carrier bandwidth and initial bandwidth part. As one operation in establishing this communications session, the base station may transmit a radio resource control (RRC) configuration message (e.g., an LTE or NR RRC message) indicating the UE should use the larger bandwidth as the UE specific carrier bandwidth.

Note that the disclosed systems and methods allow a base station to maintain the ability to service UEs that do not support larger bandwidths. For example, if a UE responds to a SIB advertising a cell specific carrier bandwidth and/or an initial bandwidth part that are smaller than the overall bandwidth (e.g., range of carrier frequencies) available for the cell with an indication that the UE supports a similar, smaller bandwidth and/or bandwidth size, the base station may then configure a communications session for the UE using the smaller bandwidth (e.g., as advertised in the SIB).

In various embodiments, the UE may include, as an indication of one or more UE capabilities, a capability indicator that the UE supports the use of a UE specific carrier bandwidth that is greater than a cell specific carrier bandwidth (and/or an initial bandwidth part). In various examples, some UEs may not be configured to support such bandwidths while other may. In various embodiments, a base station may use such an explicit capability (or absence thereof) to configure communications session for a UE.

For example, in some embodiments, a base station may determine whether a UE capabilities message includes a capability indicator that the UE supports the use of a UE specific carrier bandwidth that exceeds cell specific carrier bandwidth. If such a capability indicator is included in the capabilities message and indicates that the UE supports the use of a UE specific carrier bandwidth that exceeds cell specific carrier bandwidth, the base station may use the UE supported bandwidth included in such a message to establish a communications session for the UE. If such a capability indicator is included in the capabilities message and indicates that the UE does not support the use of a UE specific carrier bandwidth that exceeds cell specific carrier bandwidth, the base station may use the cell specific carrier bandwidth (and/or an initial bandwidth part) indicated in its SIB to establish a communications session for the UE. In another example, if there is no such capability indicator included in the capabilities message, the base station may default to using the cell specific carrier bandwidth (and/or an initial bandwidth part) indicated in its SIB to establish a communications session for the UE. In yet another example, if there is no such capability indicator included in the capabilities message, the base station may default to using the UE supported bandwidth included in such a message to establish a communications session for the UE.

In various embodiments, the UE may also, or instead, include, as an indication of one or more UE capabilities, a capability indicator that the UE supports a band that overlaps the cell specific carrier bandwidth. In various examples, some UEs may be configured to support bandwidths that extend beyond those indicated as supported in a SIB by a base station, such as a cell specific carrier bandwidth and/or an initial bandwidth part that are smaller than the overall bandwidth available for the cell. A base station may recognize this indication and configure a communications session for the UE using at least a portion of the overlapping bandwidth indicated by the UE as the UE specific carrier bandwidth. In some embodiments, as explained in more detail herein, the configured UE specific carrier bandwidth may be greater than the cell specific carrier bandwidth and/or an initial bandwidth part, smaller than the overall bandwidth available for the cell, and extending beyond the cell specific carrier bandwidth and/or an initial bandwidth part in two directions (e.g., having both higher and lower frequencies than the cell specific carrier bandwidth indicated in the SIB).

In various embodiments, as described in more detail herein, the cell specific carrier bandwidth advertised by the base station and/or used to establish a communications session for the UE may include a guard band to ensure separation from neighboring frequencies. Where the advertised cell specific carrier bandwidth (and/or initial bandwidth part) is smaller than the available cell spectrum, the advertised cell specific carrier bandwidth may include a larger guard band than may be typically associated with such a smaller cell specific carrier bandwidth so that a sufficient guard band will be available in the event that the UE specific carrier bandwidth used for the communications session exceeds the advertised cell specific carrier bandwidth.

In various embodiments, as described in more detail herein, the cell specific carrier bandwidth advertised by the base station and/or used to establish a communications session for the UE may include control channel data (e.g., physical uplink control channel (PUCCH)) that carries control information. In such embodiments, as described in more detail herein, the UE may be configured to support "nearly" contiguous allocations of bandwidth that allow the UE to utilize sections of the configured UE specific carrier bandwidth while allowing for control information to be interspersed among such sections.

By facilitating the more efficient and accurate allocation of bandwidth to UEs, the systems and methods described herein can improve the performance and increase the efficiency of both network and UE resources while improving the user experience by increasing the available bandwidth for user traffic. For example, the methods and systems described herein may be more efficient and/or more robust than conventional techniques, as they may increase the amount of bandwidth available to a UE based on its capabilities and improve network resource utilization by facilitating the interaction of UEs and network devices that may not share capabilities. That is, the methods and systems described herein provide a technological improvement over existing bandwidth allocation systems and processes by facilitating an improved user experience and increasing network efficiency by improving the accuracy of bandwidth allocation based on UE and/or base station capabilities. In addition to improving the efficiency of network and device resource utilization, the systems and methods described herein can provide more robust systems by, for example, making more efficient use of network devices and user devices by reducing unnecessary and/or unproductive device and network signaling and processing associated with smaller bandwidth allocation assigned to devices that may support larger bandwidth allocations, thereby freeing network and user device resources for more productive operations.

Illustrative environments, signal flows, and techniques for implementing systems and techniques for user equipment specific bandwidth allocation are described below. However, the described systems and techniques may be implemented in other environments.

Illustrative System Architecture

FIG. 1 is a schematic diagram of an illustrative wireless network environment 100 in which the disclosed systems and techniques may be implemented. The environment 100 may include a UE 110 that may wirelessly communicate with an gNodeB 120. While referred to as an "gNodeB" for explanatory purpose herein, the gNodeB 120 may be any type of base station, including, but not limited to, any type of BTS, NodeB, eNodeB, gNodeB, etc. The gNodeB 120 may communicate with other devices and elements in a wireless communications network 130. The wireless communications network 130 may be any one or more networks that facilitate communications between devices of various types, such as computing device and mobile devices (e.g. UEs). Various connections between devices in the network 130 may be wired, wireless, or a combination thereof. In various embodiments, the wireless communications network 130 may facilitate communications with one or more wireless devices, such as UEs. In examples, the wireless communications network 130 may facilitate packet-based communications between such wireless devices and devices on the Internet and/or one or more IP multimedia subsystems (IMSs).

The gNodeB 120 may be associated with a cell 122 and may provide wireless service to the associated geographical portion of the network 130. The gNodeB 120 may broadcast (e.g., periodically) one or more SIBs that advertise its availability for providing access to and services associated with the network 130. Such SIBs may further advertise capabilities associated with the gNodeB 120, such as specific bandwidths and bandwidth parts supports by the gNodeB 120. For example the gNodeB may broadcast a SIB 140 that may indicate, among other data, an initial bandwidth part 144 that may be of a substantially similar or same size as an indicated cell specific carrier bandwidth 146. As illustrated in this figure, the initial bandwidth part 144 and cell specific carrier bandwidth 146 may be narrower, or otherwise associated with a subset of, the available carrier bandwidth 142. Note that in some embodiments, the carrier bandwidth 142 may not be indicated in the SIB 140, while in other embodiments, it may (e.g., as a particular band, such as n12, n25, n85, n99, etc.).

In order to establish a wireless communications session with the network 130, the UE 110 may request the establishment of a wireless communications session with the network 130 through interaction with the gNodeB 120. As part of the communications establishment process, the UE 110 may transmit a UE capabilities message 150 to the gNodeB 120. The UE capabilities message 150 may include an indication of a UE bandwidth capability 152 that may indicate the bandwidth that the UE may support. This bandwidth may be greater than that indicated as the cell specific carrier bandwidth 146 and/or the initial bandwidth part 144 in the SIB 140. In various embodiments, the UE capabilities message 150 may also, or instead, include a capability indicator 154 of whether the UE 110 supports using a UE specific carrier bandwidth that is greater than a cell specific carrier bandwidth.

To continue the communications establishment process, the gNodeB 120 may indicate to the UE 110 the configuration information it may use to conduct communications with the gNodeB 120 in an RRC configuration message 160. Included in the RRC configuration message 160 may be a UE specific carrier bandwidth 164. The UE specific carrier bandwidth 164 may be substantially similar to or the same as the UE bandwidth capability 152 and may be larger than the cell specific carrier bandwidth 146 and/or the initial bandwidth part 144 indicated in the SIB 140. The UE specific carrier bandwidth 164 may be substantially similar to or the same as the carrier bandwidth 142 or it may be narrower than the carrier bandwidth 142 while remaining larger than the cell specific carrier bandwidth 146 and/or the initial bandwidth part 144. While shown in the figure at least for ease of comparison, the RRC configuration message 160 may or may not include indications of the carrier bandwidth 142 and/or the initial bandwidth part 144.

In various embodiments where the UE capabilities message 150 may include the capability indicator 154, the gNodeB 120 may transmit the RRC configuration message 160 based on determining that the capability indicator 154 indicates that the UE 110 supports using a UE specific carrier bandwidth that is greater than a cell specific carrier bandwidth. In other embodiments, where the UE 110 indicates using the capability indicator 154 that it does not support using a UE specific carrier bandwidth that is greater than a cell specific carrier bandwidth, the gNodeB 120 may transmit a SIB that instructs the UE to use the cell specific carrier bandwidth 146 and/or the initial bandwidth part 144.

Illustrative Signal Flows

Figure 2:
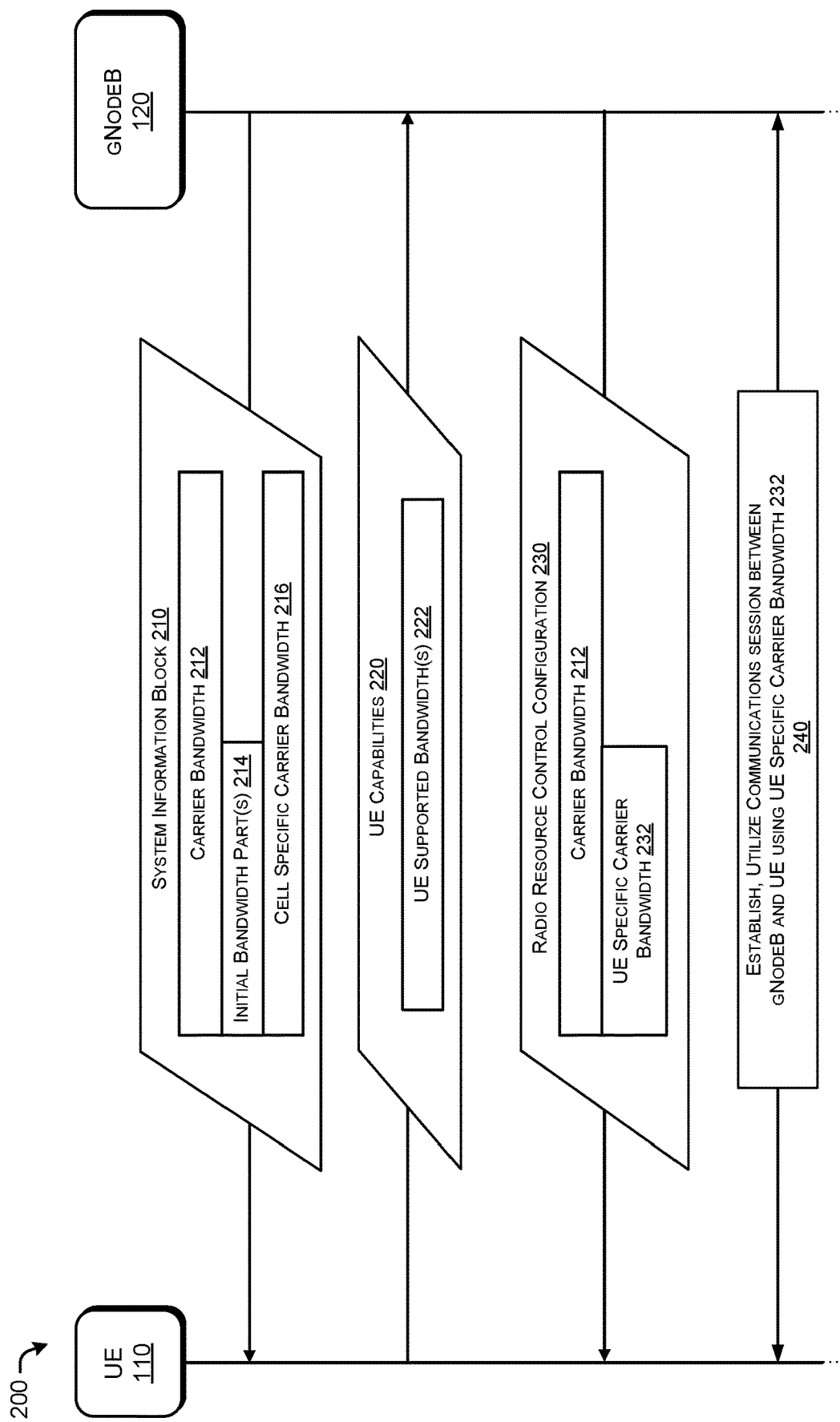
FIG. 2 is a diagram of an illustrative signal flow associated with systems and methods for allocating UE bandwidth, in accordance with examples of the disclosure.

FIG. 2 illustrates an exemplary signal flow 200 of various messages that may be exchanged in one or more of the disclosed systems and techniques for more efficiently and accurately allocating bandwidth for a UE. Reference may be made in this description of the signal flow 200 to devices, messages, and operations illustrated in FIG. 1 and described in regard to that figure. However, the operations, signals, and signal flow illustrated in FIG. 2 and described herein may be implemented in any suitable system and/or with any one or more suitable devices and/or entities. Moreover, any of the operations, signals, and/or entities described in regard to FIG. 2 may be used separately and/or in conjunction with other operations, signals, and/or entities. All such embodiments are contemplated as within the scope of the instant disclosure.

The gNodeB 120 may broadcast (e.g., periodically) a SIB 210 that may indicate, among other data, an initial bandwidth part 214 that may (e.g., substantially) smaller than a cell specific carrier bandwidth 216 and/or available carrier bandwidth 212. Note that in some embodiments, the carrier bandwidth 212 may not be indicated in the SIB 210, while in other embodiments, it may be indicated (e.g., as a particular band, such as n12, n25, n85, n99, etc.).

In order to establish a wireless communications session with the network 130, the UE 110 may request the establishment of a wireless communications session from the gNodeB 120. As part of the communications establishment process, the UE 110 may transmit a UE capabilities message 220 to the gNodeB 120. The UE capabilities message 220 may include an indication of a UE supported bandwidth 222 that may indicate the bandwidth that the UE may support. This bandwidth 222 may be greater than that indicated by the initial bandwidth part 214 in the SIB 210 and may be less than or equal to the cell specific carrier bandwidth 216.

To continue the communications establishment process, the gNodeB 120 may indicate to the UE 110 the configuration information it may use to conduct communications with the gNodeB 120 in an RRC configuration message 230. In this case, because the gNodeB 120 is not configured to operate using UE specific carrier bandwidths that are greater than the cell specific carrier bandwidth 216, the gNodeB 120 may assign UE specific carrier bandwidths that are no larger than the initial bandwidth part 214. Therefore, the gNodeB 120 may transmit the RRC configuration message 230 to the UE 110 indicating the UE specific carrier bandwidth 232 that may be substantially similar or the same size as the initial bandwidth part 214 and smaller than the cell specific carrier bandwidth 216. Notably, the UE specific carrier bandwidth 232 may also be (e.g., substantially) smaller than the UE supported bandwidth 222. This may result in lower performance for the UE 110 when the UE 110 and gNodeB 120 establish and utilize the communications session at operation 240.

Figure 3:
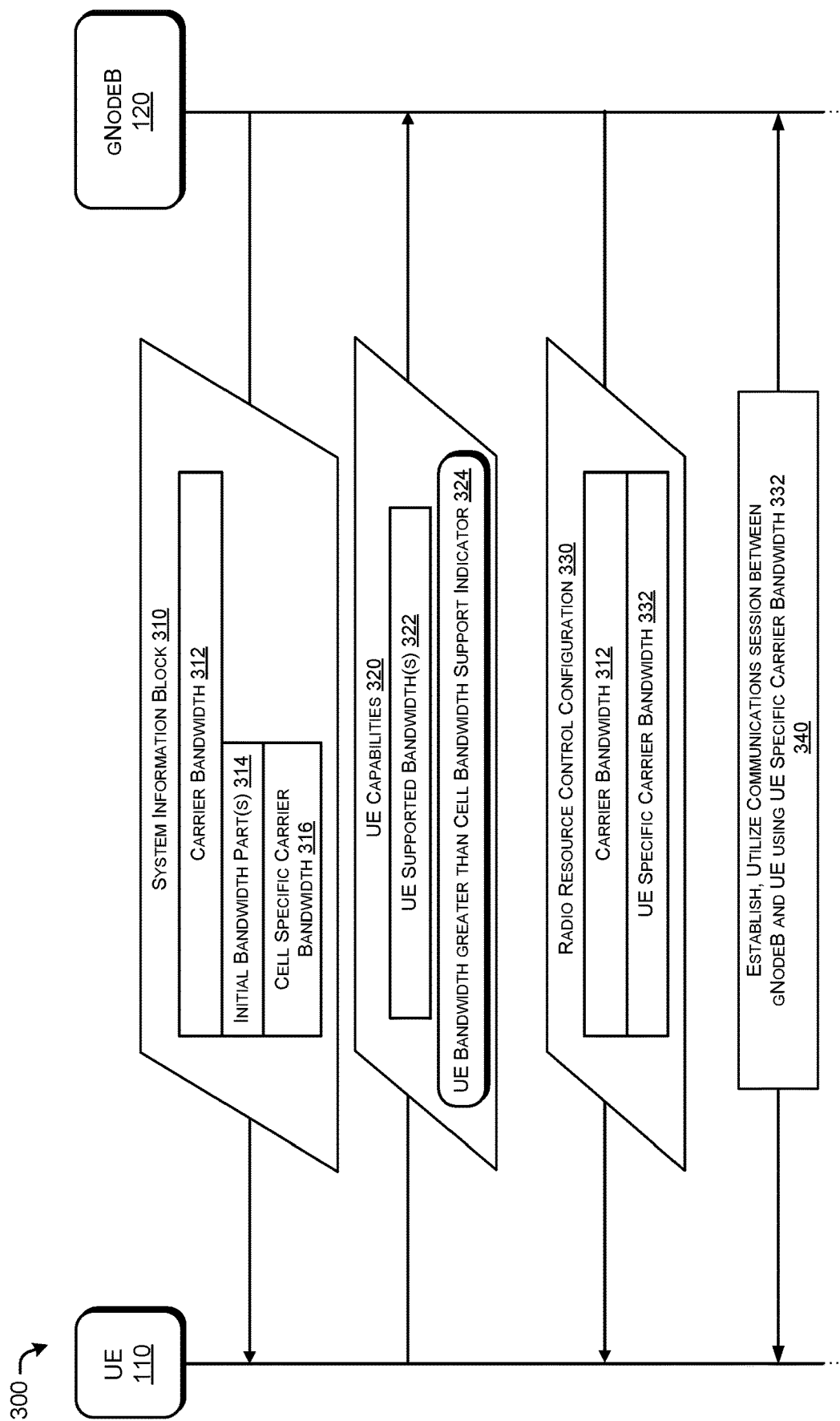
FIG. 3 is a diagram of an illustrative signal flow associated with systems and method for allocating UE specific carrier bandwidth, in accordance with examples of the disclosure.

In various embodiments, this lower performance condition may be addressed using UE specific carrier bandwidths that may be larger than indicated cell specific carrier bandwidths by a gNodeB capable of supporting the larger bandwidth. FIG. 3 illustrates an exemplary signal flow 300 of various messages that may be exchanged in one or more of the disclosed systems and techniques for more efficiently and accurately allocating bandwidth for a UE. Reference may be made in this description of the signal flow 300 to devices, messages, and operations illustrated in FIG. 1 and described in regard to that figure. However, the operations, signals, and signal flow illustrated in FIG. 3 and described herein may be implemented in any suitable system and/or with any one or more suitable devices and/or entities. Moreover, any of the operations, signals, and/or entities described in regard to FIG. 3 may be used separately and/or in conjunction with other operations, signals, and/or entities. All such embodiments are contemplated as within the scope of the instant disclosure.

The gNodeB 120 may broadcast (e.g., periodically) a SIB 310 that may indicate, among other data, an initial bandwidth part 314 and a cell specific carrier bandwidth 316 that may (e.g., substantially) smaller than an available carrier bandwidth 312. Note that in some embodiments, the carrier bandwidth 312 may not be indicated in the SIB 310, while in other embodiments, it may be indicated (e.g., as a particular band, such as n12, n25, n85, n99, etc.).

In order to establish a wireless communications session with the network 130, the UE 110 may request the establishment of a wireless communications session from the gNodeB 120. As part of the communications establishment process, the UE 110 may transmit a UE capabilities message 320 to the gNodeB 120. The UE capabilities message 320 may include an indication of a UE supported bandwidth 322 that may indicate the bandwidth that the UE may support. This bandwidth 322 may be (e.g. substantially) greater than that indicated by the initial bandwidth part 314 and/or the cell specific carrier bandwidth 316. This bandwidth 322 may be smaller than, greater than, or substantially the same size as the carrier bandwidth 312.

In various embodiments where the UE capabilities message 320 may include an indicator 324 that may indicate whether the UE 110 supports the use of a UE specific carrier bandwidth that is greater than a cell specific carrier bandwidth.

Based on the UE capabilities message 320, the gNodeB 120 may determine configuration parameters for the UE 110 and may indicate such parameters in an RRC configuration message 330. For example, the gNodeB 120 may determine that the bandwidth 322 is greater than the initial bandwidth part 314 and/or the cell specific carrier bandwidth 316 and may determine, based on this, that the UE 110 supports the use of a UE specific carrier bandwidth that is greater than a cell specific carrier bandwidth. In response, the gNodeB 120 may indicate to the UE 110 in the RRC configuration message 330 that the UE 110 is to use the UE specific carrier bandwidth 332, which may be substantially similar to the UE supported bandwidth 322. Alternatively, or in addition, the gNodeB 120 may determine whether the indicator 324 indicates that the UE 110 supports the use of a UE specific carrier bandwidth that is greater than a cell specific carrier bandwidth, and, in response, may indicate to the UE 110 in the RRC configuration message 330 that the UE 110 is to use the UE specific carrier bandwidth 332.

At operation 340, the gNodeB 120 and the UE 110 may establish and utilize a communications session using the determined UE specific carrier bandwidth 332.

Illustrative Data Structures

Figure 4:
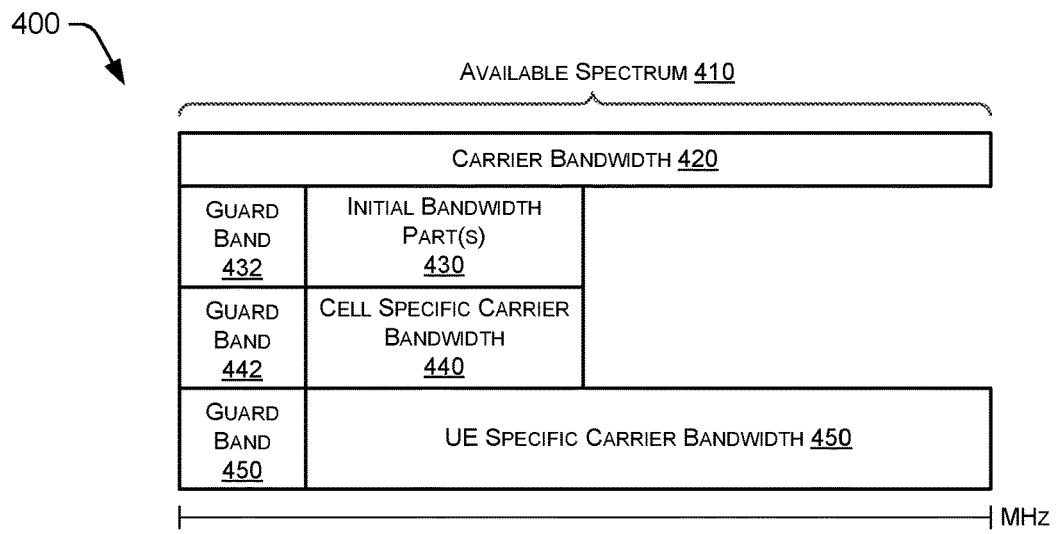
FIG. 4 is a diagram of illustrative bandwidth data structures associated with systems and method for allocating UE specific carrier bandwidth, in accordance with examples of the disclosure.

FIG. 4 shows a block diagram representing illustrate bandwidth data structures 400 that includes comparative views of various carrier bandwidths and components thereof according to the disclosed examples. The bandwidth data structures 400 may represent the bandwidth available at a cell and managed by a gNodeB, such as gNodeB 120 at cell 122. Of the total available spectrum 410 in the cell, the available carrier bandwidth 420 may be used by the gNodeB to service UEs. In various embodiments, the available carrier bandwidth 420 may be substantially similar to or the same as the total available spectrum 410, while in other embodiments, the available carrier bandwidth 420 may be a subset of the total available spectrum 410 (e.g., that is smaller than the total available spectrum 410).

As described herein, the gNodeB may determine an initial bandwidth parts 430 that is a subset of the carrier bandwidth 420 and that is substantially similar in size to the cell specific carrier bandwidth 440. However, based on an indicated UE supported bandwidth provided by the UE, the gNodeB may determine a UE specific carrier bandwidth 450 for use with the UE that is (e.g., substantially) greater than the initial bandwidth parts 430 and/or the cell specific carrier bandwidth 440. In various embodiments, the UE specific carrier bandwidth 450 may be less than or substantially the same as the carrier bandwidth 420.

In various embodiments, to properly support the use of a specific carrier bandwidth 450 that is (e.g., substantially) greater than the initial bandwidth parts 430 and/or the cell specific carrier bandwidth 440, the gNodeB may associate a guard band 432 and/or a guard band 442 with the initial bandwidth parts 430 and the cell specific carrier bandwidth 440, respectively. The guard bands 432 and 442 may be larger than guard bands typically associated with carriers of the size of the initial bandwidth parts 430 and/or the cell specific carrier bandwidth 440. This is because the guard band 450 may be substantially similarly sized as the guard bands 432 and 442, and the guard band 450 may be used as a guard band for the UE specific carrier bandwidth 450, which may be (e.g., substantially) larger than the initial bandwidth parts 430 and the cell specific carrier bandwidth 440.

Figure 5:
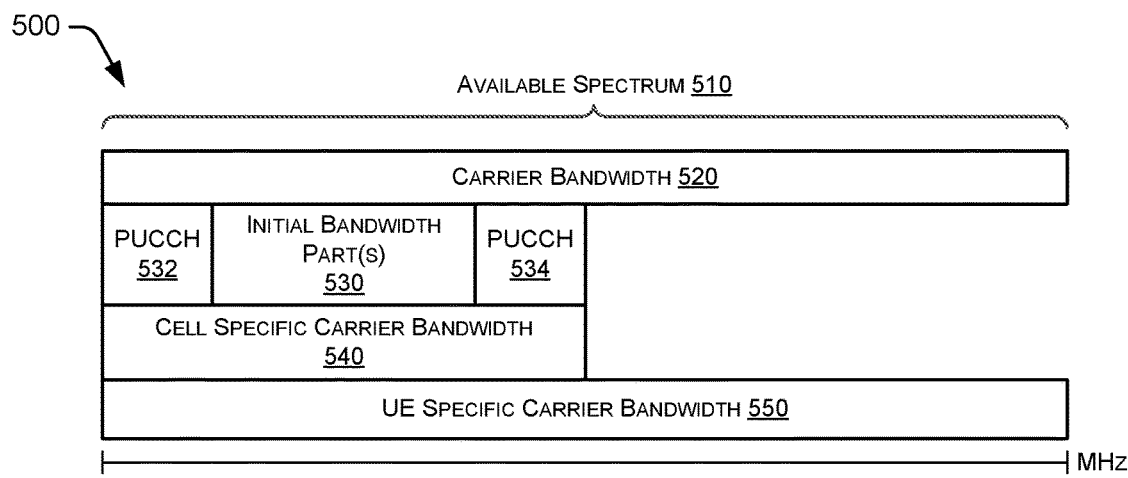
FIG. 5 is a diagram of illustrative bandwidth data structures associated with systems and method for allocating UE specific carrier bandwidth, in accordance with examples of the disclosure.

FIG. 5 shows a block diagram representing illustrate bandwidth data structures 500 that includes comparative views of various carrier bandwidths and components thereof according to the disclosed examples. The bandwidth data structures 500 may represent the bandwidth available at a cell and managed by a gNodeB, such as gNodeB 120 at cell 122. Of the total available spectrum 510 in the cell, the available carrier bandwidth 520 may be used by the gNodeB to service UEs. In various embodiments, the available carrier bandwidth 520 may be substantially similar to or the same as the total available spectrum 510, while in other embodiments, the available carrier bandwidth 520 may be a subset of the total available spectrum 510 (e.g., that is smaller than the total available spectrum 510).

As described herein, the gNodeB may determine an initial bandwidth parts 530 that is a subset of the carrier bandwidth 520. The gNodeB may also determine a cell specific carrier bandwidth 540. As shown here, the gNodeB may also associate PUCCH 532 and PUCCH 534 that may be included in or otherwise associated with the initial bandwidth parts 530 to account for control traffic that will be required to establish and maintain a communications session. In such embodiments, the cell specific carrier bandwidth 540 may be of a size substantially similar to the size of the initial bandwidth parts 530 including the PUCCH 532 and the PUCCH 534.

Here again, based on an indicated UE supported bandwidth provided by the UE, the gNodeB may determine a UE specific carrier bandwidth 550 for use with the UE that is (e.g., substantially) greater than the initial bandwidth parts 530 (e.g., including the PUCCH 532 and the PUCCH 534) and/or the cell specific carrier bandwidth 540. In various embodiments, the UE specific carrier bandwidth 550 may be less than or substantially the same as the carrier bandwidth 520.

In this example and others, the cell specific carrier bandwidth 540 and the UE specific carrier bandwidth 550 may both start at a same lowest frequency starting point. This starting point may be indicated by a same or substantially similar "offsetToCarrier" parameter associated with both the cell specific carrier bandwidth 540 and the UE specific carrier bandwidth 550.

In various embodiments, because the gNodeB may insert control channel information (e.g., PUCCH data) between subsets of the UE specific carrier bandwidth 550 at intervals based on the size of the initial bandwidth parts 530, the UE may be configured to support contiguous allocations of bandwidth in such subsets (e.g., "nearly" contiguous allocations of bandwidth). In such embodiments, the UE maybe configured to recombine data separated by such control channel information to make full use of the UE specific carrier bandwidth 550.

Figure 6:
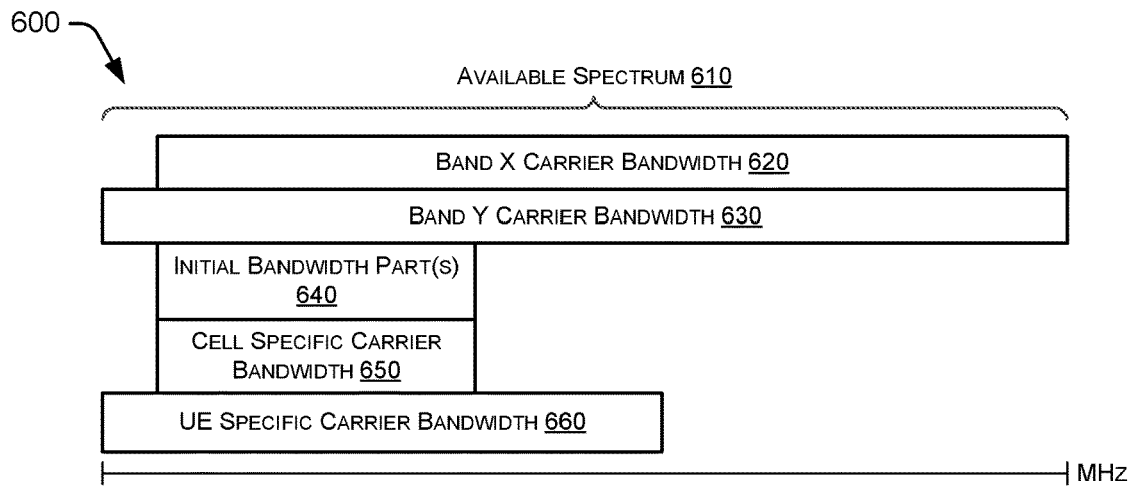
FIG. 6 is a diagram of illustrative bandwidth data structures associated with systems and method for allocating UE specific carrier bandwidth, in accordance with examples of the disclosure.

FIG. 6 shows a block diagram representing illustrate bandwidth data structures 600 that includes comparative views of various carrier bandwidths and components thereof according to the disclosed examples. The bandwidth data structures 600 may represent the bandwidth available at a cell and managed by a gNodeB, such as gNodeB 120 at cell 122. Of the total available spectrum 610 in the cell, this gNodeB may support two bands of bandwidth that overlap. Both of the available carrier bandwidths for bands X 620 and Y 630 may be used by the gNodeB to service UEs. In various embodiments, the available carrier bandwidths 620 and 630 may overlap but may not be the same. One or both of these bands may be substantially similar to or the same as the total available spectrum 610. One of these bands may be (e.g., substantially) smaller than the other.

As described herein, the gNodeB may determine an initial bandwidth parts 640 that is a subset of the band X carrier bandwidth 620. The gNodeB may also determine a cell specific carrier bandwidth 650 that is also a subset of the band X carrier bandwidth 620. The UE may receive an indication of UE supported bandwidth provided by the UE that indicates that the UE supports bandwidth greater than the initial bandwidth parts 640 and/or the cell specific carrier bandwidth 650. The UE supported bandwidth may also be extend beyond the initial bandwidth parts 640 and/or the cell specific carrier bandwidth 650 in two directions. In other words, the UE supported bandwidth may include frequencies higher and lower than those of the cell specific carrier bandwidth 650. As shown in this figure, the gNodeB may, in response to the indication of this UE supported bandwidth, determine the UE specific bandwidth that is a subset of the band Y carrier bandwidth 630 and extends beyond the band X carrier bandwidth 620. In this way, the gNodeB may support UEs capable of using portions of the band Y carrier bandwidth 630 that extend outside of the band X carrier bandwidth 620 while also supporting those UEs that are only capable of operating within the band X carrier bandwidth 620.

In this example and others, the UE specific carrier bandwidth 660 may start at a lower frequency starting point than a cell specific carrier bandwidth such as the band X carrier bandwidth 620. In such examples, the starting point for the UE specific carrier bandwidth 660 may be indicated by an "offsetToCarrier" parameter that indicates the starting frequency for the UE specific carrier bandwidth 660 is lower than the starting frequency for the band X carrier bandwidth 620. For example, the band X carrier bandwidth 620 may have an "offsetToCarrier" parameter that indicates a starting frequency for the band X carrier bandwidth 620 that is higher than the starting frequency for the UE specific carrier bandwidth 660. The band Y carrier bandwidth 630 may have an "offsetToCarrier" parameter that indicates a starting frequency for the band Y carrier bandwidth 630 that is the same or substantially similar to than the starting frequency for the UE specific carrier bandwidth 660.

In a particular example, the gNodeB may be configured to operate in a band X carrier bandwidth 620 of n12 (e.g., with a downlink carrier range of frequencies of 729 MHz-746 MHz) and a band Y carrier bandwidth 630 of n85 (e.g., with a downlink carrier range of frequencies of 728 MHz-746 MHz). The gNodeB may set the cell specific carrier bandwidth 650 to 729 MHz-734 MHz and an initial bandwidth parts 640 having a width of 5 MHz. The UE may indicate a supported bandwidth capability of 728 MHz-738 MHz. In this example, the gNodeB may, in response to the indication of this UE supported bandwidth, determine a UE specific carrier bandwidth 660 of 728 MHz-738 MHz. This is a subset of the band Y carrier bandwidth 630 of 728 MHz-746 MHz that extends beyond the band X carrier bandwidth 620 of 729 MHz-746 MHz and is larger than the cell specific carrier bandwidth 650 to 729 MHz-734 MHz and the 5 MHz width of the initial bandwidth parts 640.

Illustrative Operations

Figure 7:
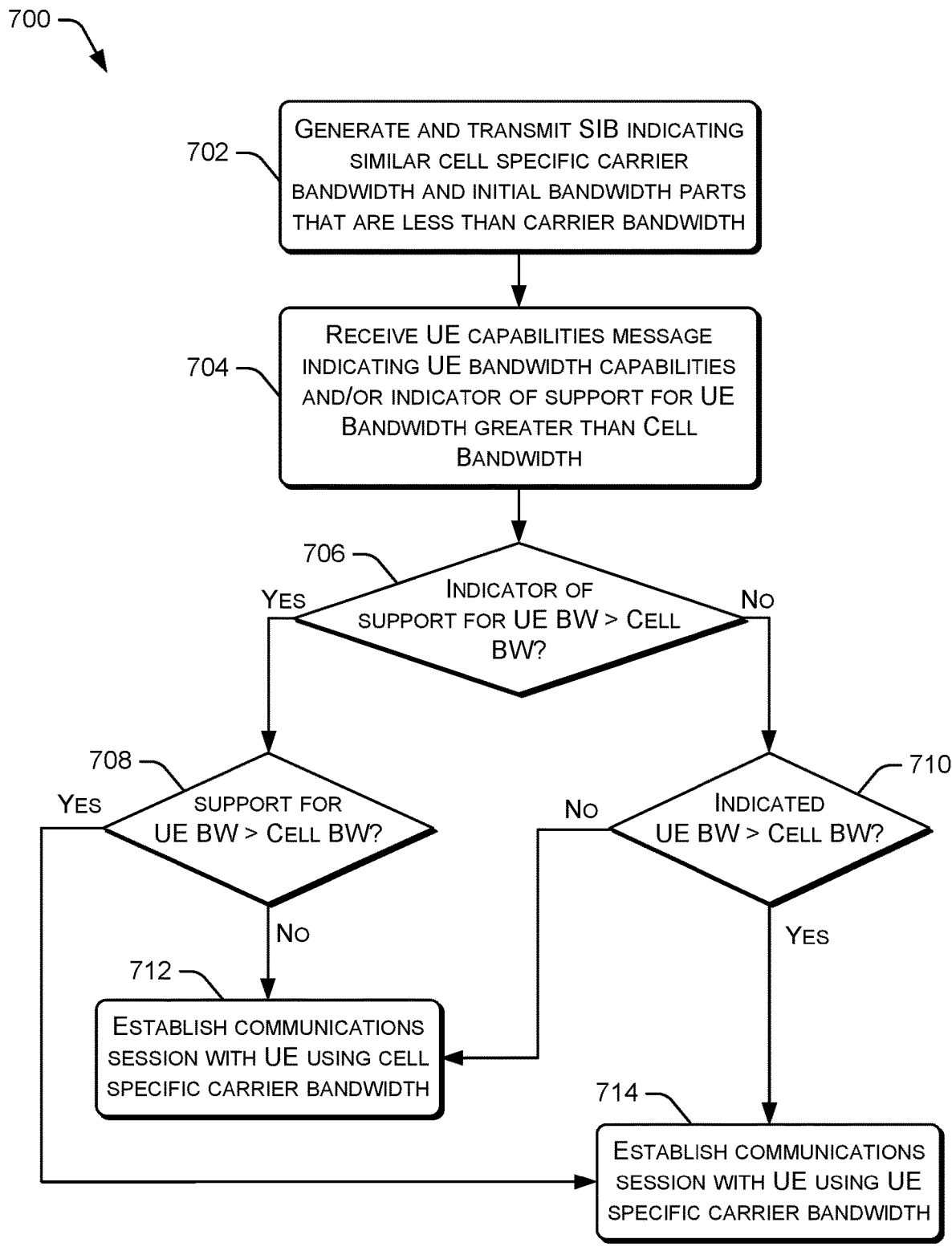
FIG. 7 is a flow diagram of an illustrative process for allocating UE specific carrier bandwidth, in accordance with examples of the disclosure.

FIG. 7 shows a flow diagram of an illustrative process 700 for performing UE specific bandwidth allocation for a UE according to the disclosed embodiments. The process 700 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 700 may be described with reference to the wireless network environment 100 of FIG. 1, however other environments may also be used.

At block 702, a gNodeB may generate and transmit (e.g., broadcast) a SIB into an environment. The SIB may include an indication of a cell specific carrier bandwidth and/or an indication of an initial bandwidth part. The cell specific carrier bandwidth advertised in the SIB may be a subset of the carrier bandwidth or spectrum available to the gNodeB and may be substantially similar to or the same (e.g., size) as the initial bandwidth part.

At block 704, the gNodeB may receive a UE capabilities message that may indicate a bandwidth supported by a UE. The UE capabilities message may also, or instead, include data indicating whether the UE supports the use of UE specific carrier bandwidth that is greater than the cell specific carrier bandwidth, for example, as advertised by a gNodeB at block 702.

At block 706, the gNodeB may determine if the UE capabilities message includes an indicator that indicates whether the UE supports the use of UE specific carrier bandwidth that is greater than the cell specific carrier bandwidth. If so, the process 700 may proceed to block 708 where the gNodeB may determine if the indicator indicates that the UE supports the use of UE specific carrier bandwidth that is greater than the cell specific carrier bandwidth.

If the indicator indicates that the UE supports the use of UE specific carrier bandwidth that is greater than the cell specific carrier bandwidth, the process 700 may proceed to block 714 where the gNodeB may establish a communications session with the UE by using the bandwidth indicated as supported by the UE at block 704 to configure a UE specific carrier bandwidth. This UE specific carrier bandwidth may be greater than the cell specific carrier bandwidth and/or the initial bandwidth part advertised by the gNodeB at block 702. The gNodeB may provide the UE specific carrier bandwidth to the UE in an RRC configuration message as described herein.

Returning to block 708, if the indicator received at block 704 from the UE indicates that the UE does not support the use of UE specific carrier bandwidth that is greater than the cell specific carrier bandwidth, the process 700 may proceed to block 712 where the gNodeB may establish a communications session with the UE by using the cell specific carrier bandwidth and/or the initial bandwidth part advertised by the gNodeB at block 702. The gNodeB may provide to the UE the cell specific carrier bandwidth for use in this communications session in an RRC configuration message as described herein.

Returning to block 706, in examples where the UE capabilities message does not include an indicator that indicates whether the UE supports the use of UE specific carrier bandwidth that is greater than the cell specific carrier bandwidth and/or in examples where such indications and capabilities are not explicitly signaled, the process may proceed to block 710 where the gNodeB may determine if the bandwidth indicated as supported by the UE at block 704 is greater than the cell specific carrier bandwidth and/or the initial bandwidth part advertised by the gNodeB at block 702.

If the bandwidth indicated as supported by the UE at block 704 is not greater than the cell specific carrier bandwidth and/or the initial bandwidth part advertised by the gNodeB at block 702, the process 700 may proceed to block 712 where the gNodeB may establish a communications session with the UE by using the cell specific carrier bandwidth and/or the initial bandwidth part advertised by the gNodeB at block 702. The gNodeB may provide to the UE the cell specific carrier bandwidth for use in this communications session in an RRC configuration message as described herein.

Returning to block 710, if the bandwidth indicated as supported by the UE at block 704 is greater than the cell specific carrier bandwidth and/or the initial bandwidth part advertised by the gNodeB at block 702, the process 700 may proceed to block 714 where the gNodeB may establish a communications session with the UE by using the bandwidth indicated as supported by the UE at block 704 to configure a UE specific carrier bandwidth. This UE specific carrier bandwidth may be greater than the cell specific carrier bandwidth and/or the initial bandwidth part advertised by the gNodeB at block 702. The gNodeB may provide the UE specific carrier bandwidth to the UE in an RRC configuration message as described herein.

In summary, by more efficiently and accurately selecting appropriate bandwidth allocations to provide to a UE, the disclosed systems and techniques may be able to increase the efficiency of usage of UE resources and wireless network resources and improve the user experience and performance of both the network and user devices.

Example User Equipment

Figure 8:
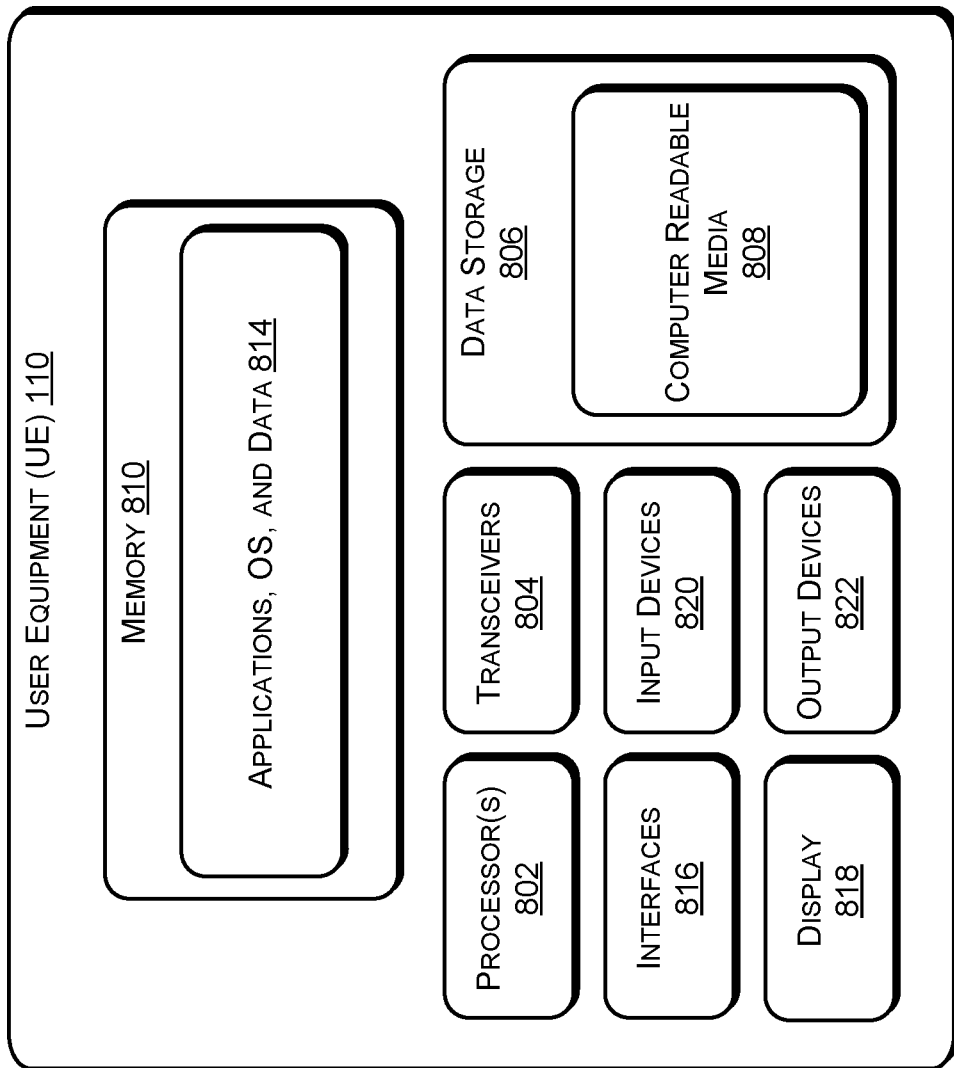
FIG. 8 is a schematic diagram of illustrative components in an example user device that is configured for allocating UE specific carrier bandwidth, in accordance with examples of the disclosure.

FIG. 8 is an example of a UE, such as UE 110, for use with the systems and methods disclosed herein, in accordance with some examples of the present disclosure. The UE 110 may include one or more processors 802, one or more transmit/receive antennas (e.g., transceivers or transceiver antennas) 804, and a data storage 806. The data storage 806 may include a computer readable media 808 in the form of memory and/or cache. This computer-readable media may include a non-transitory computer-readable media. The processor(s) 802 may be configured to execute instructions, which can be stored in the computer readable media 808 and/or in other computer readable media accessible to the processor(s) 802. In some configurations, the processor(s) 802 is a Central Processing Unit (CPU), a Graphics Processing Unit (GPU), or both CPU and GPU, or any other sort of processing unit. The transceiver antenna(s) 804 can exchange signals with a base station, such as eNodeB 120.

The UE 110 may be configured with a memory 810. The memory 810 may be implemented within, or separate from, the data storage 806 and/or the computer readable media 808. The memory 810 may include any available physical media accessible by a computing device to implement the instructions stored thereon. For example, the memory 810 may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which may be used to store the desired information and which may be accessed by the UE 110.

The memory 810 can store several modules, such as instructions, data stores, and so forth that are configured to execute on the processor(s) 802. In configurations, the memory 810 may also store one or more applications 814 configured to receive and/or provide voice, data and messages (e.g., SMS messages, Multi-Media Message Service (MMS) messages, Instant Messaging (IM) messages, Enhanced Message Service (EMS) messages, etc.) to and/or from another device or component (e.g., the eNodeB 120). The applications 814 may also include one or more operating systems and/or one or more third-party applications that provide additional functionality to the UE 110. The memory may also, or instead, store bandwidth information, such as UE supported bands, bandwidth(s) and bandwidth parts, as well as communications session information such as UE specific carrier bandwidth(s).

Although not all illustrated in FIG. 8, the UE 110 may also comprise various other components, e.g., a battery, a charging unit, one or more network interfaces 816, an audio interface, a display 818, a keypad or keyboard, and one or more input devices 820, and one or more output devices 822.

Example Computing Device

Figure 9:
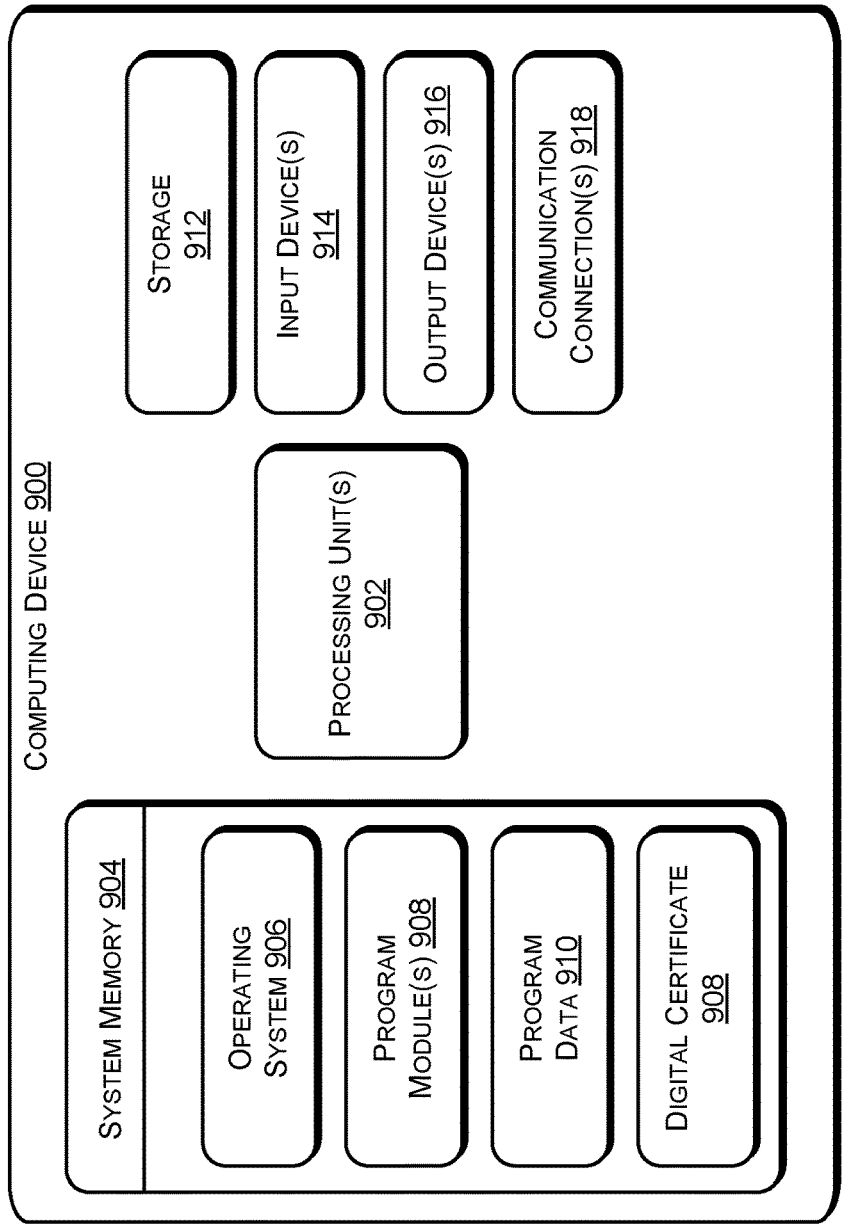
FIG. 9 is a schematic diagram of illustrative components in an example computing device that is configured for allocating UE specific carrier bandwidth, in accordance with examples of the disclosure.

FIG. 9 is an example of a computing device 900 for use with the systems and methods disclosed herein, in accordance with some examples of the present disclosure. The computing device 900 can be used to implement various components of a core network, a base station (e.g., gNodeB 120), and/or any servers, routers, gateways, gateway elements, administrative components, etc. that can be used by a communication provider. One or more computing devices 900 can be used to implement the network 130, for example. One or more computing devices 900 can also be used to implement base stations and other components.

In various embodiments, the computing device 900 can include one or more processing units 902 and system memory 904. Depending on the exact configuration and type of computing device, the system memory 904 can be volatile (such as RAM), non-volatile (such as ROM, flash memory, etc.) or some combination of the two. The system memory 904 can include an operating system 906, one or more program modules 908, and can include program data 910. The system memory 904 may be secure storage or at least a portion of the system memory 904 can include secure storage. The secure storage can prevent unauthorized access to data stored in the secure storage. For example, data stored in the secure storage can be encrypted or accessed via a security key and/or password.

The computing device 900 can also include additional data storage devices (removable and/or non-removable) such as, for example, magnetic disks, optical disks, or tape. Such additional storage is illustrated in FIG. 9 by storage 912.

The computing device 900 may store, in either or both of the system memory 904 and the storage 912, bandwidth information, such as available spectrum, available carrier bandwidth, UE supported bands, bandwidth(s) and bandwidth parts, cell specific carrier bandwidth(s), and/or UE specific carrier bandwidth(s) for one or more UEs.

Non-transitory computer storage media of the computing device 900 can include volatile and nonvolatile, removable and non-removable media implemented in any method or technology for storage of information, such as computer readable instructions, data structures, program modules, or other data. The system memory 904 and storage 912 are examples of computer readable storage media. Non-transitory computer readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 900. Any such non-transitory computer readable storage media can be part of the computing device 900.

In various embodiment, any or all of the system memory 904 and storage 912 can store programming instructions which, when executed, implement some or all of the functionality described above as being implemented by one or more systems configured in the environment 100 and/or components of the network 130.

The computing device 900 can also have one or more input devices 914 such as a keyboard, a mouse, a touch-sensitive display, voice input device, etc. The computing device 900 can also have one or more output devices 916 such as a display, speakers, a printer, etc. can also be included. The computing device 900 can also contain one or more communication connections 918 that allow the device to communicate with other computing devices using wired and/or wireless communications.

Example Clauses

The following paragraphs describe various examples. Any of the examples in this section may be used with any other of the examples in this section and/or any of the other examples or embodiments described herein.

A: A method performed by a base station configured in a wireless communications network, the method comprising: generating a system information block at the comprising: a cell specific carrier bandwidth indicator associated with a first range of frequencies; and an initial bandwidth parts indicator associated with a first frequency width corresponding to the first range of frequencies, wherein the first range of frequencies is a subset of a range of carrier frequencies available to the base station and having a second frequency width greater than the first frequency width; broadcasting the system information block; receiving a user equipment (UE) capabilities message from a mobile device, the UE capabilities message comprising a UE bandwidth capability indicator associated with a second range of frequencies of a third frequency width that is greater than the first frequency width; determining a UE specific carrier bandwidth corresponding to the second range of frequencies; and establishing a wireless communications session with the mobile device using the UE specific carrier bandwidth.

B: The method of paragraph A, wherein the UE specific carrier bandwidth is substantially similar to the range of carrier frequencies.

C: The method of paragraph A or B, wherein the second range of frequencies corresponds to a second range of carrier frequencies that is distinct from the range of carrier frequencies.

D: The method of paragraph C, wherein a first frequency of the second range of frequencies is a lower frequency than a first frequency of the range of carrier frequencies.

E: The method of paragraph C, wherein: the second range of carrier frequencies corresponds to an n85 band; and the range of carrier frequencies corresponds to an n12 band.

F: The method of any of paragraphs A-E, wherein: the UE capabilities message further comprises a capability indicator indicating that the mobile device supports use of a UE specific carrier bandwidth width that is greater than a cell specific carrier bandwidth width; and determining the UE specific carrier bandwidth is based at least in part on the capability indicator.

G: A base station comprising: one or more processors; one or more transceivers; and non-transitory computer-readable media storing computer-executable instructions that, when executed by the one or more processors, cause the one or more processors to perform operations comprising: generating a first system information block at the comprising a cell specific carrier bandwidth indicator associated with a first range of frequencies that is a subset of a range of carrier frequencies and that have a first frequency width less than a second frequency width of the range of carrier frequencies; broadcasting the first system information block; receiving a user equipment (UE) capabilities message from a mobile device, the UE capabilities message comprising a UE bandwidth capability indicator associated with a second range of frequencies; determining a UE specific carrier bandwidth based at least in part on the UE capabilities message; and transmitting a second system information block to mobile device to configure the mobile device with the UE specific carrier bandwidth.

H: The base station of paragraph G, wherein the UE capabilities message further comprises a capability indicator indicating whether the mobile device supports use of a UE specific carrier bandwidth width that is greater than a cell specific carrier bandwidth width; and determining the UE specific carrier bandwidth is further based at least in part on the capability indicator.

I: The base station of paragraph H, wherein: the capability indicator indicates that the mobile device does not support use of the UE specific carrier bandwidth width that is greater than the cell specific carrier bandwidth width; and determining the UE specific carrier bandwidth comprises determining, based at least in part on the capability indicator, the UE specific carrier bandwidth to be substantially similar to the cell specific carrier bandwidth.

J: The base station of paragraph H, wherein: the capability indicator indicates that the mobile device supports use of the UE specific carrier bandwidth width that is greater than the cell specific carrier bandwidth width; and determining the UE specific carrier bandwidth comprises determining, based at least in part on the capability indicator, the UE specific carrier bandwidth to be substantially similar to the second range of frequencies.

K: The base station of paragraph J, wherein the second range of frequencies comprises a third frequency width that is greater than the first frequency width.

L: The base station of any of paragraphs G-K, wherein the second range of frequencies is a subset of a second range of carrier frequencies that is distinct from the range of carrier frequencies.

M: The base station of paragraph L, wherein a first frequency of the second range of frequencies is a lower frequency than a first frequency of the range of carrier frequencies.

N: The base station of any of paragraphs G-M, the second range of frequencies comprises a third frequency width that is greater than the first frequency width and less than the second frequency width.

O: A non-transitory computer-readable media storing computer-executable instructions that, when executed by one or more processors, cause the one or more processors to perform operations comprising: generating a system information block at the comprising a cell specific carrier bandwidth indicator associated with a first range of frequencies that is a subset of a range of carrier frequencies and that have a first frequency width less than a second frequency width of the range of carrier frequencies; broadcasting the system information block; receiving a user equipment (UE) capabilities message from a mobile device, the UE capabilities message comprising a UE bandwidth capability indicator associated with a second range of frequencies; determining a UE specific carrier bandwidth based at least in part on the UE capabilities message; and establishing a wireless communications session with the mobile device using the UE specific carrier bandwidth.

P: The non-transitory computer-readable media of paragraph O, wherein the system information block further comprises an initial bandwidth parts indicator associated with a third frequency width that is less than a fourth frequency width of the second range of frequencies.

Q: The non-transitory computer-readable media of paragraph P, wherein determining the UE specific carrier bandwidth is further based at least in part on the third frequency width.

R: The non-transitory computer-readable media of any of paragraphs O-Q, wherein the range of carrier frequencies comprises one or more of an n12 band or an n85 band.

S: The non-transitory computer-readable media of any of paragraphs O-R, wherein the second range of frequencies is substantially similar to the range of carrier frequencies.

T: The non-transitory computer-readable media of any of paragraphs O-S, wherein the second range of frequencies comprises a first lowest frequency that is less than a second lowest frequency of the range of carrier frequencies.

While the example clauses described above are described with respect to one particular implementation, it should be understood that, in the context of this document, the content of the example clauses can also be implemented via a method, device, system, computer-readable medium, and/or another implementation. Additionally, any of the examples A-T can be implemented alone or in combination with any other one or more of the examples A T.

CONCLUSION

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method performed by a base station configured in a wireless communications network, the method comprising:
    generating a system information block comprising:
        a cell specific carrier bandwidth indicator associated with a first range of frequencies; and
        an initial bandwidth parts indicator associated with a first frequency width corresponding to the first range of frequencies,
        wherein the first range of frequencies is a subset of a range of carrier frequencies available to the base station and having a second frequency width greater than the first frequency width;
    broadcasting the system information block;
    receiving a user equipment (UE) capabilities message from a mobile device, the UE capabilities message comprising a UE bandwidth capability indicator associated with a second range of frequencies of a third frequency width that is greater than the first frequency width;
    determining a UE specific carrier bandwidth corresponding to the second range of frequencies; and
    establishing a wireless communications session with the mobile device using the UE specific carrier bandwidth.

2. The method of claim 1, wherein the UE specific carrier bandwidth is substantially similar to the range of carrier frequencies.

3. The method of claim 1, wherein the second range of frequencies corresponds to a second range of carrier frequencies that is distinct from the range of carrier frequencies.

4. The method of claim 3, wherein a first frequency of the second range of frequencies is a lower frequency than a first frequency of the range of carrier frequencies.

5. The method of claim 3, wherein:
    the second range of carrier frequencies corresponds to an n85 band; and
    the range of carrier frequencies corresponds to an n12 band.

6. The method of claim 1, wherein:
    the UE capabilities message further comprises a capability indicator indicating that the mobile device supports use of a UE specific carrier bandwidth width that is greater than a cell specific carrier bandwidth width; and
    determining the UE specific carrier bandwidth is based at least in part on the capability indicator.

7. A base station comprising:
    one or more processors;
    one or more transceivers; and
    non-transitory computer-readable media storing computer-executable instructions that, when executed by the one or more processors, cause the one or more processors to perform operations comprising:

generating a first system information block comprising a cell specific carrier bandwidth indicator associated with a first range of frequencies that is a subset of a range of carrier frequencies and that have a first frequency width less than a second frequency width of the range of carrier frequencies;

broadcasting the first system information block;

receiving a user equipment (UE) capabilities message from a mobile device, the UE capabilities message comprising a UE bandwidth capability indicator associated with a second range of frequencies of a third frequency width that is greater than the first frequency width;

determining a UE specific carrier bandwidth based at least in part on the UE capabilities message; and transmitting a second system information block to mobile device to configure the mobile device with the UE specific carrier bandwidth.

8. The base station of claim 7, wherein the UE capabilities message further comprises a capability indicator indicating whether the mobile device supports use of a UE specific carrier bandwidth width that is greater than a cell specific carrier bandwidth width; and determining the UE specific carrier bandwidth is further based at least in part on the capability indicator.

9. The base station of claim 8, wherein:

the capability indicator indicates that the mobile device does not support use of the UE specific carrier bandwidth width that is greater than the cell specific carrier bandwidth width; and determining the UE specific carrier bandwidth comprises determining, based at least in part on the capability indicator, the UE specific carrier bandwidth to be substantially similar to a cell specific carrier bandwidth.

10. The base station of claim 8, wherein:

the capability indicator indicates that the mobile device supports use of the UE specific carrier bandwidth width that is greater than the cell specific carrier bandwidth width; and determining the UE specific carrier bandwidth comprises determining, based at least in part on the capability indicator, the UE specific carrier bandwidth to be substantially similar to the second range of frequencies.

11. The base station of claim 7, wherein the second range of frequencies is a subset of a second range of carrier frequencies that is distinct from the range of carrier frequencies.

12. The base station of claim 11, wherein a first frequency of the second range of frequencies is a lower frequency than a first frequency of the range of carrier frequencies.

13. The base station of claim 7, wherein the third frequency width is less than the second frequency width.

14. A non-transitory computer-readable media storing computer-executable instructions that, when executed by one or more processors, cause the one or more processors to perform operations comprising:

generating a system information block comprising a cell specific carrier bandwidth indicator associated with a first range of frequencies that is a subset of a range of carrier frequencies and that have a first frequency width less than a second frequency width of the range of carrier frequencies;

broadcasting the system information block;

receiving a user equipment (UE) capabilities message from a mobile device, the UE capabilities message comprising a UE bandwidth capability indicator associated with a second range of frequencies of a third frequency width that is greater than the first frequency width;

determining a UE specific carrier bandwidth based at least in part on the UE capabilities message; and establishing a wireless communications session with the mobile device using the UE specific carrier bandwidth.

15. The non-transitory computer-readable media of claim 14, wherein determining the UE specific carrier bandwidth is further based at least in part on the third frequency width.

16. The non-transitory computer-readable media of claim 14, wherein the range of carrier frequencies comprises one or more of an n12 band or an n85 band.

17. The non-transitory computer-readable media of claim 14, wherein the second range of frequencies is substantially similar to the range of carrier frequencies.

18. The non-transitory computer-readable media of claim 14, wherein the second range of frequencies comprises a first lowest frequency that is less than a second lowest frequency of the range of carrier frequencies.

* * * * *